United States Patent
Lee

[11] Patent Number: 5,704,632
[45] Date of Patent: Jan. 6, 1998

[54] SUSPENSION SYSTEM FOR A VEHICLE

[75] Inventor: Unkoo Lee, Kyungki-do, Rep. of Korea

[73] Assignee: Hyundai Motor Company, Seoul, Rep. of Korea

[21] Appl. No.: 448,604

[22] PCT Filed: Nov. 1, 1994

[86] PCT No.: PCT/KR94/00152

§ 371 Date: Jun. 7, 1995

§ 102(e) Date: Jun. 7, 1995

[87] PCT Pub. No.: WO95/12499

PCT Pub. Date: May 11, 1995

[30] Foreign Application Priority Data

Nov. 1, 1993 [KR] Rep. of Korea ............. 1993-23003

[51] Int. Cl.$^6$ ............................................. B60G 3/00
[52] U.S. Cl. .................. 280/690; 280/690; 280/224; 280/96.1
[58] Field of Search ...................... 280/690, 724, 280/701, 688, 95.1, 96.1, 660, 670

[56] References Cited

U.S. PATENT DOCUMENTS

| | | | |
|---|---|---|---|
| 3,292,945 | 12/1966 | Dangauthier | 280/124 |
| 4,761,017 | 8/1988 | Claux | 280/660 |
| 4,881,752 | 11/1989 | Tanaka | 280/690 |
| 5,080,389 | 1/1992 | Kawano et al. | 280/667 |
| 5,108,126 | 4/1992 | Banse | 280/668 |

FOREIGN PATENT DOCUMENTS 2636568 3/1990 France.

Primary Examiner—Eric D. Culbreth
Assistant Examiner—Jonathan E. Butto
Attorney, Agent, or Firm—Birch, Stewart, Kolasch & Birch, LLP

[57] ABSTRACT

A suspension system for a vehicle which has a wheel carrier, an upper control link having a horizontal arm, a vertical arm and a hinge portion therebetween, the hinge portion of the upper control ink being hingedly connected to a subframe of a vehicle body, front and rear lower control links for connecting a lower portion of the wheel carrier to the subframe, a trailing arm disposed in a longitudinal direction of the vehicle and mounted between the vehicle body and the wheel carrier, and a shock absorber assembly mounted between the wheel carrier and the vertical arm of the upper control link, said suspension system improving ride comfort by reducing the impact from the wheel and providing an advantage in additional space for passengers or trunk storage.

10 Claims, 5 Drawing Sheets

SUSPENSION SYSTEM FOR A VEHICLE

BACKGROUND OF THE INVENTION

(1) Field of the Invention

The present invention relates to a suspension system for the non-driven wheels of a vehicle, and more particularly to a suspension system for a vehicle which can improve ride comfort by absorbing the vibrations from the wheel to the vehicle body by means of a horizontally disposed shock absorber assembly. The suspension system also maximizes the inner space of the vehicle for passengers including the trunk, and improves cornering stability by pushing the lower portion of the wheel.

(2) Description of the Conventional Art

The common designs for a suspension system of a vehicle are Wishbone and MacPherson types. FIG. 7A shows a conventional MacPherson type suspension system which comprises a steering knuckle 104, a strut 106 having a shock absorber 101 and a spring 102, and a lower arm 108.

FIG. 7B shows a conventional Wishbone type suspension system which comprises a steering knuckle 111, upper and lower control links 112 and 113, a spring assembly 114 disposed between the upper and lower control links 112 and 113.

In the conventional MacPherson and Wishbone type suspension systems, since the shock absorber assembly is disposed vertically, though somewhat inclined, impact from the wheel is transmitted directly in the vertical direction of the vehicle body. Thus, there is a limit in reducing the impact and in improving ride comfort, and it is therefore difficult to design the system. Also, since the camber changes toward the positive (+) when the wheel bumps against the road condition, the tire efficiency decreases and the cornering stability is not good.

SUMMARY OF THE INVENTION

Therefore, the present invention has been made in an effort to solve the above-described problems.

It is an object of the present invention to provide a suspension system for a vehicle which improves ride comfort when the wheel moves in bounce and rebound.

It is another object of the present invention to provide a suspension system which can enlarge the passenger space or trunk space.

It is still another object of the present invention to provide a suspension system which has improved cornering stability.

In order to achieve the above objects, the invention provides a suspension system which comprises a wheel carrier, an upper control link having a horizontal arm, a vertical arm, and a hinge portion disposed therebetween. The hinge portion of the upper control link is hingedly connected to a subframe of a vehicle body, front and rear lower control links for connecting a lower portion of the wheel carrier to the subframe, a trailing arm disposed in the longitudinal direction of the vehicle and connected to the vehicle body and the wheel carrier, and a shock absorber assembly having a shock absorber and a spring, mounted between the wheel carrier and the vertical arm of the upper control link.

The impact from the wheel is not transmitted to the vehicle body directly but rather in a reduced amount because of this configuration. Thus, ride comfort is improved. Also, the lower portion of the wheel carrier is pushed by the shock absorber assembly, during bumping of the wheel, to improve the cornering stability and driving stability. Further, the horizontally disposed absorber can enlarge the space for the passengers and the trunk. Still further, the trailing arm contributes to increasing the stiffness of the whole structure of the suspension system.

Other and further objects of the present invention will become obvious upon an understanding of the illustrative embodiments about to be described and indicated in the appended claims, and various advantages not referred to herein will occur to one skilled in the art upon employment of the invention in practice.

BRIEF DESCRIPTION OF THE DRAWINGS

The present invention will become more fully understood from the detailed description given hereinbelow and the accompanying drawings which are given by way of illustration only, and thus, are not limitative of the present invention, and wherein.

DETAILED DESCRIPTION OF THE PREFERRED EMBODIMENT

Figure 1:
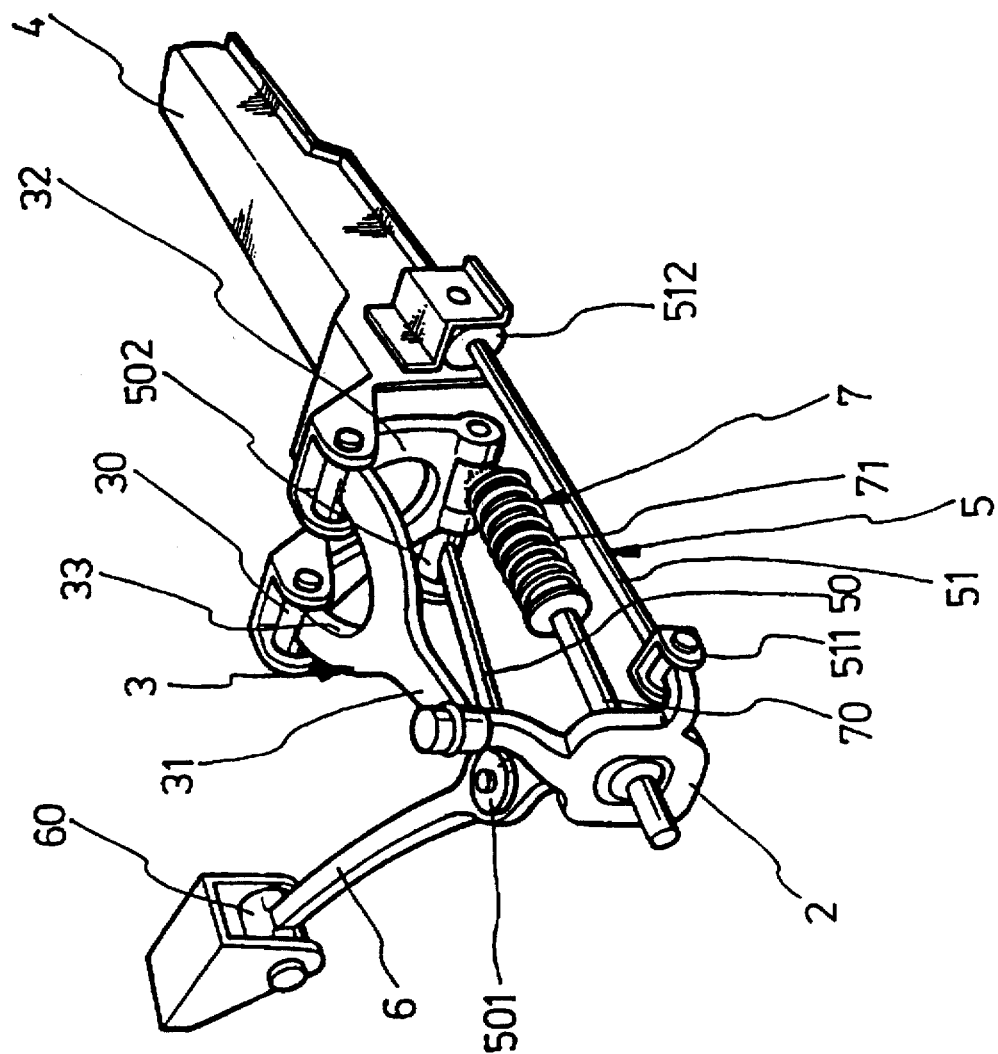
FIG. 1 is a perspective view of the suspension system of the present invention.
Figure 2:
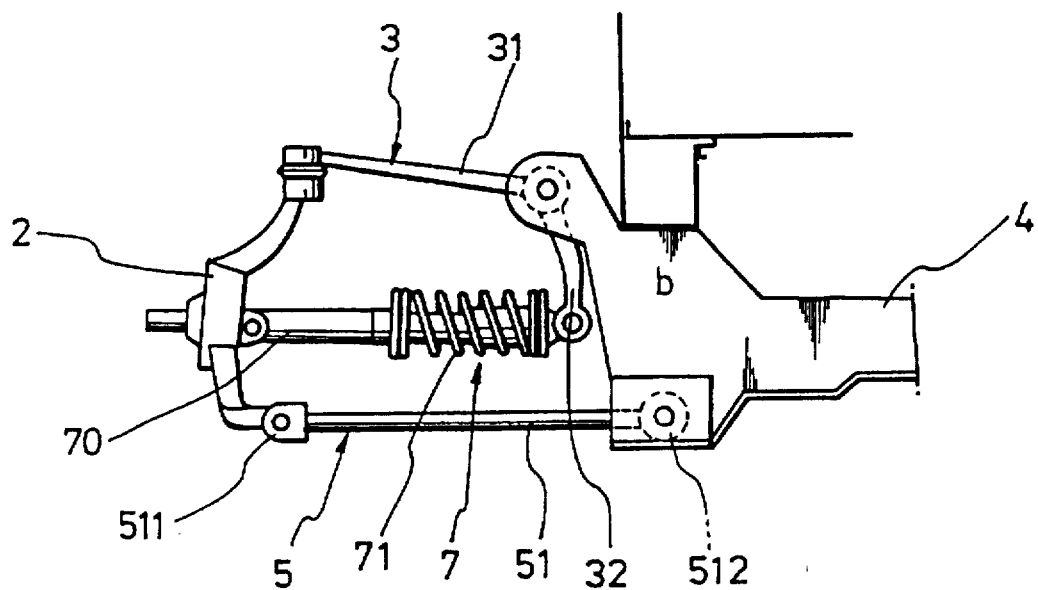
FIG. 2 is a side view thereof.
Figure 3:
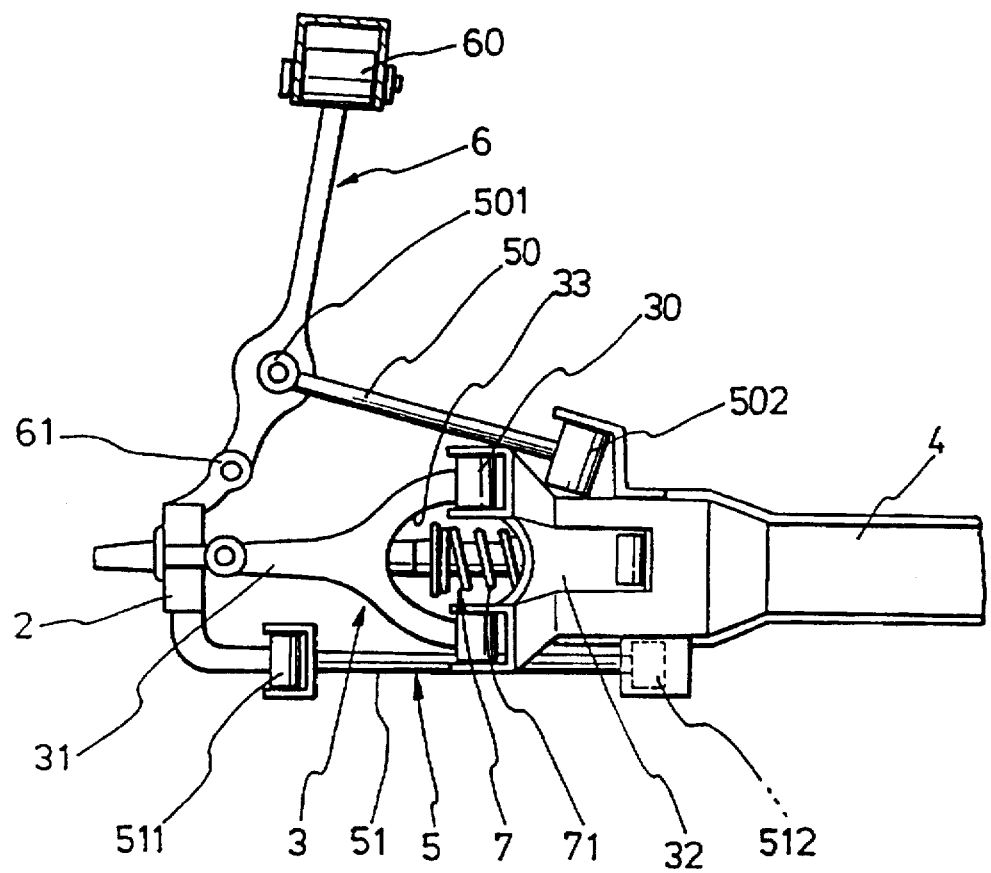
FIG. 3 is a plan view thereof.

The preferred embodiments will be described in detail with reference to the drawings. FIGS. 1 through 4 show an embodiment of the suspension system according to the present invention. The wheel carrier 2 rotatably supports the wheel, having upper and lower portions to which upper and lower control links 3 and 5 are connected, respectively.

The upper control link 3 for connecting the upper portion of the wheel carrier 2 to the sub-frame or the vehicle body 4 has horizontal and vertical arms 31 and 32 and a pair of hinge portions 30 therebetween. The horizontal arm 31 diverges to form a pair of hinge portions 30 and from there the vertical arm 32 converges to the lower portion thereof. The horizontal arm 31 is connected to the upper portion of the wheel carrier 2 by a ball joint (not shown) and the hinge portions 30 are hingedly connected to the subframe or the vehicle body 4 via an elastic bushing (not shown).

The angle between the horizontal and vertical arms 31 and 32 is preferred to be more than 90 degrees. The divergence and convergence of the upper control link 3 allows a passageway for a drive shaft, if it is applied to a driving wheel, and at least contributes to the structural stability of the suspension system.

The lower control link 5 includes a front lower control link 50 and a rear lower control link 51.

The rear lower control link 51 is connected to the wheel carrier 2 at a connecting portion 511 and to the subframe 4 at a connecting portion 512 via an elastic bushing, while the front lower control link 50 is connected to the trailing arm 6 at a connecting portion 501 and to the subframe 4 at a connecting portion 502 via an elastic bushing.

The trailing arm 6 having front and rear ends 60 and 61 is disposed in the longitudinal direction of the vehicle, and the front and rear ends 60 and 61 are connected to the vehicle body and the wheel carrier 2, respectively, via an elastic bushing. The trailing arm 6 absorbs impact in the longitudinal direction of the vehicle.

The shock absorber assembly 7 having a shock absorber 70 and a spring 71 is pivotally connected to the lower portion of the wheel carrier 2 at one end thereof via an elastic bushing and hingedly connected to the lower end of the vertical arm 32 of the upper control link 3 via an elastic bushing at the other end. The shock absorber assembly 7 is almost horizontally disposed.

The elastic bushing and the ball joint used in the suspension system according to the present invention are conventional and the descriptions thereof will be omitted.

Figure 4:
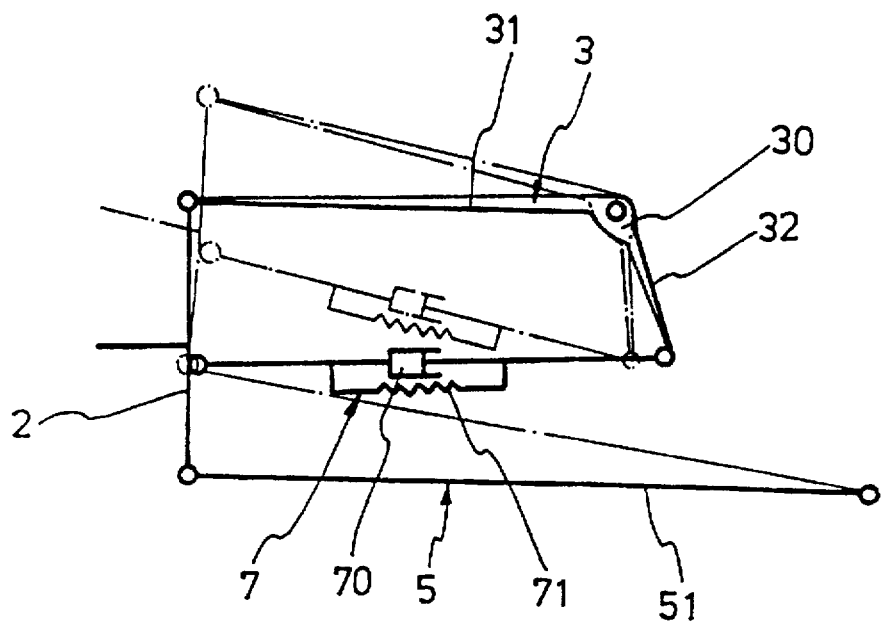
FIG. 4 shows an operation of the suspension system of the invention.

Operation of the suspension system according to the present invention will be described with reference to FIG. 4. When the wheel strikes a bump, the wheel carrier 2 moves upward in connection with the upper and lower control links 3 and 5, as indicated in the imaginary line of FIG. 4. The upper control link 3 rotates about the hinge portion 30 in a clockwise direction and the vertical arm 32 of the upper control link 3 compresses the shock absorber assembly 7 such that the impact or vibration is dampened.

By this operation, the impact or vibration which is transmitted directly to a shock absorber is transmitted to the shock absorber assembly 7 and the subframe 4 via the upper control link 3 having a pair of hinge portions 30. Thus, the impact or vibration transmitted to the vehicle body are relatively reduced and ride comfort is improved.

Further, when the wheel bumps, the shock absorber assembly 7 pushes the lower portion of the wheel carrier 2 outwardly and controls camber to a negative (−) state, which enhances cornering stability and driving stability.

Still further, the horizontally disposed shock absorber assembly 7 provides the advantage in additive space for passengers or trunk storage. The trailing arm 6 contributes to increasing the stiffness of the whole structure of the suspension system.

Figure 5:
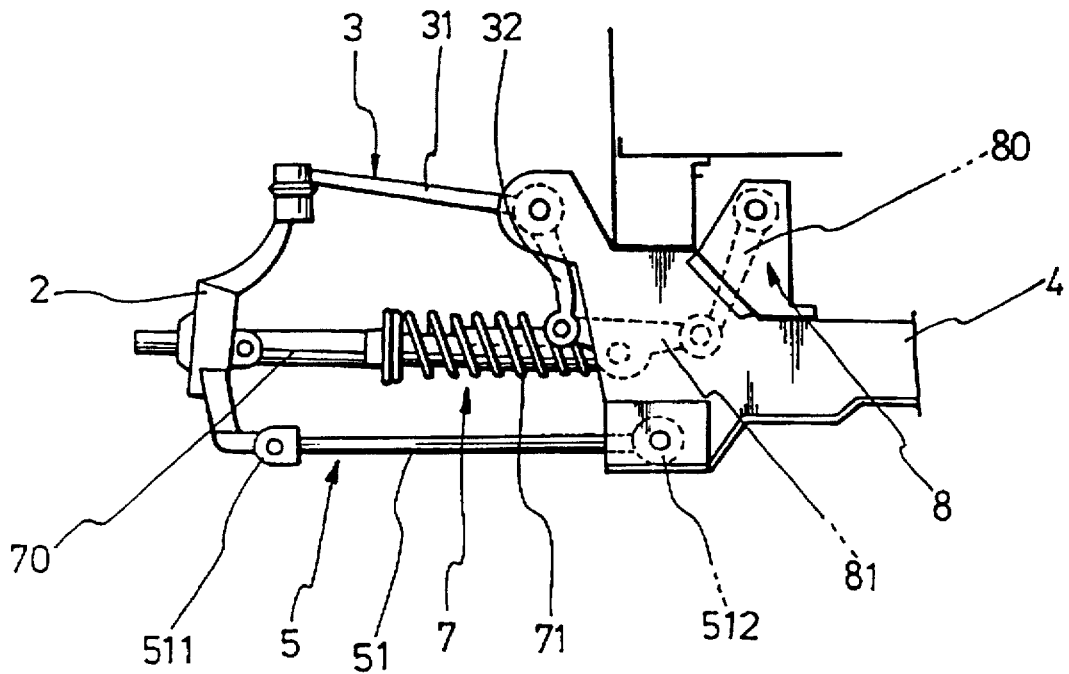
FIG. 5 is a side view of the suspension system of a second embodiment according to the present invention.

Another embodiment according to the present invention is illustrated in FIG. 5, wherein the same elements as those in the previously described embodiments are designated by the same reference numerals and the description thereof will be omitted.

In this embodiment, the shock absorber assembly 7 is connected to a portion near the middle portion of a coupler 81 for connecting the vertical arm 32 to a vertical link 80 hingedly connected to the subframe 4.

Figure 6:
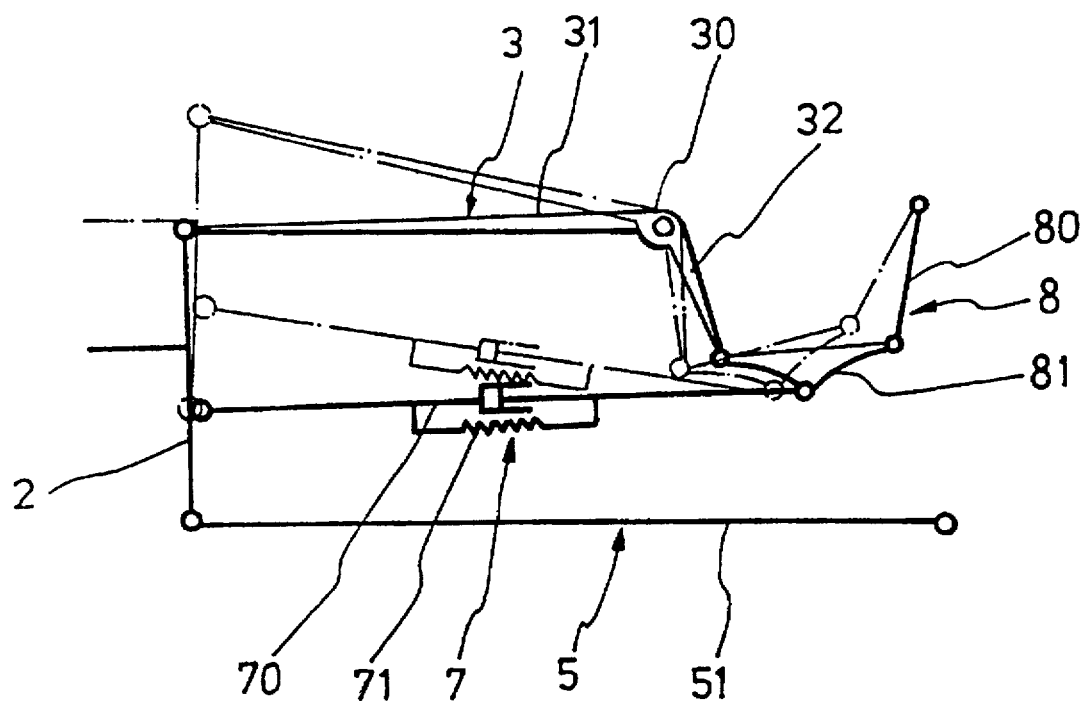
FIG. 6 shows the operation of the suspension system of the second embodiment according to the present invention.
Figure 7A:
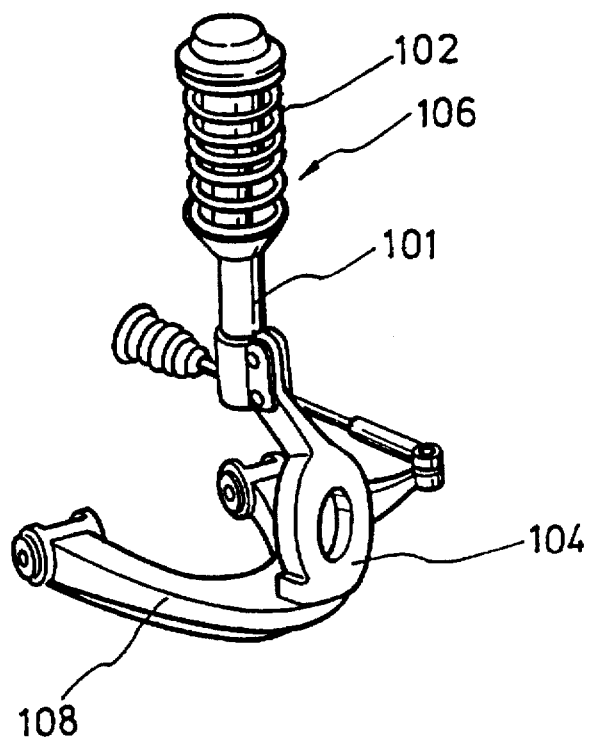
FIGS. 7A and 7B are schematic views of conventional suspension systems.
Figure 7B:
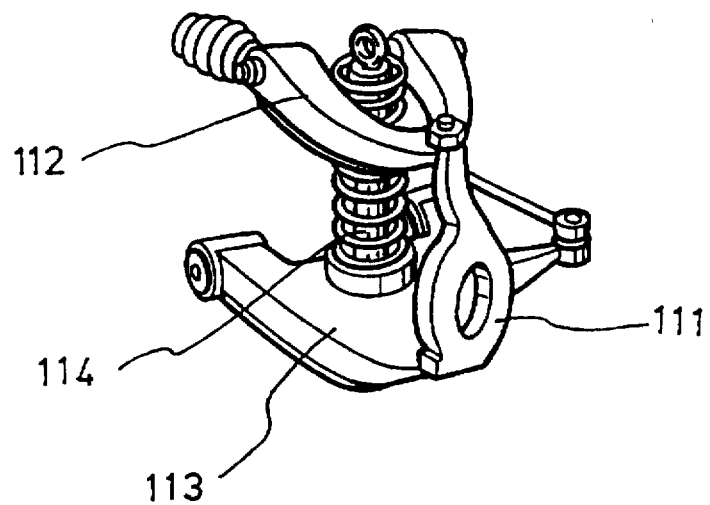

Referring to FIG. 6, when the wheel bumps, the upper control link 3 rotates about the hinge portion 30 in a clockwise direction and the coupler 81 and the vertical link 80 rotate in accordance with the movement of the upper control link 3. Then the coupler 81 pushes the shock absorber assembly 7. Since the operation of this embodiment is similar to that of the first embodiment, other descriptions of the operation will be omitted.

It should be readily apparent from the foregoing description that the second embodiment according to the invention provides a suspension system having the similar effects to that of the first embodiment.

What is claimed is:

1. A suspension system for a vehicle comprising:

a wheel carrier having upper and lower portions;

an upper control link having a horizontally disposed arm connected by at least one hinge portion to a vertically disposed arm, said at least one hinge portion of the upper control link also being hingedly connected to a vehicle body, and the horizontally disposed arm being connected to the upper portion of the wheel carrier;

a trailing arm disposed in the longitudinal direction of the vehicle and connected to the vehicle body and the wheel carrier;

a front lower control link connected at one end to the trailing arm and at the other end to the vehicle body, and a rear lower control link connected at one end to said lower portion of the wheel carrier and at the other end to the vehicle body; and a shock absorber assembly operatively connected to the lower portion of said wheel carrier and to the vertically disposed arm of the upper control link.

2. The suspension system for a vehicle according to claim 1, wherein the horizontally disposed arm of said upper control link diverges to form a pair of hinge portions and from said hinge portions said vertically disposed arm of said upper control link converges to hingedly connect with said shock absorber assembly.

3. The suspension system for a vehicle according to claim 1, wherein an obtuse angle is formed between the horizontal and vertical arms of said upper control link.

4. The suspension system for a vehicle according to claim 1, wherein the front lower control link is connected to said wheel carrier via said trailing arm.

5. The suspension system for a vehicle according to claim 1, wherein said shock absorber assembly is disposed substantially horizontally.

6. A suspension system for a vehicle comprising:

a wheel carrier having upper and lower portions;

an upper control link having a horizontally disposed arm connected by at least one hinge portion to a vertically disposed arm, the at least one hinge portion of the upper control link also being hingedly connected to a vehicle body, and the horizontally disposed arm being connected to the upper portion of the wheel carrier;

a trailing arm disposed in the longitudinal direction of the vehicle and connected to the vehicle body and the wheel carrier;

a front lower control link connected at one end to the trailing arm and at the other end to the vehicle body, and a rear lower control link connected at one end to said lower portion of the wheel carrier and at the other end to the vehicle body;

a vertical link having a first end hingedly connected to the vehicle body and a second end;

a coupler connecting the second end of said vertical link to a lower portion of the vertically disposed arm of said upper control link; and a shock absorber assembly operatively connected to the lower portion of said wheel carrier and said coupler.

7. The suspension system for a vehicle according to claim 6, wherein the horizontally disposed arm of said upper control link diverges to form a pair of hinge portions and from said hinge portions said vertically disposed arm of said upper control link converges to hingedly connect with said coupler.

8. The suspension system for a vehicle according to claim 6, wherein an obtuse angle is formed between the horizontal and vertical arms of said upper control link.

9. The suspension system for a vehicle according to claim 6, wherein the front lower control link is connected to said wheel carrier via said trailing arm.

10. The suspension system for a vehicle according to claim 6, wherein said shock absorber assembly is disposed substantially horizontally.

* * * * *